United States Patent [19]

Rowland-Hill

[11] 4,208,858
[45] Jun. 24, 1980

[54] ISOLATED PNEUMATIC CLEANING SYSTEM
[75] Inventor: Edward W. Rowland-Hill, Lancaster, Pa.
[73] Assignee: Sperry Rand Corporation, New Holland, Pa.
[21] Appl. No.: 11,353
[22] Filed: Feb. 12, 1979
[51] Int. Cl.[2] .................. A01D 45/02; A01F 12/20
[52] U.S. Cl. ................................... 56/14.6; 130/27 T
[58] Field of Search ............ 56/14.6; 130/27 T, 27 R, 130/27 Z

[56] References Cited
U.S. PATENT DOCUMENTS

| 3,669,122 | 6/1972 | Rowland-Hill | 130/27 T |
| 3,847,160 | 11/1974 | De Coene | 130/27 T |
| 3,916,912 | 11/1975 | Rowland-Hill | 130/27 T |
| 4,078,571 | 3/1978 | Todd et al. | 130/27 T |

*Primary Examiner*—Russell R. Kinsey
*Attorney, Agent, or Firm*—Ralph D'Alessandro; Frank A. Seemar; Larry W. Miller

[57] ABSTRACT

In a harvesting and threshing machine utilizing at least one cooperative cylinder and rotatable rotor to achieve axial flow threshing and separation of grain bearing crop material there is provided an improved grain collection means underlying the auxiliary separation and discharge means and overlying at least a portion of the primary cleaning and separating means movably mounted to the frame of the machine in such a manner that air flow generated by the cleaning fan is not disturbed by the rotation of the rotor or the beater means of the auxiliary separation and discharge means.

8 Claims, 4 Drawing Figures

ISOLATED PNEUMATIC CLEANING SYSTEM

BACKGROUND OF THE INVENTION

The present invention relates generally to a mobile grain harvesting and threshing machine and, more particularly, to an axial flow combine in which there is provided an improved grain receiving area for collecting threshed and separated grain without the disruptive effect of air currents generated by the operational rotary components.

The instant invention is generally incorporated in an axial flow type combine having longitudinally extending threshing and separating means. The threshing and separating means are in the form of a pair of side-by-side rotors with distinct threshing and separating sections. This type of axial flow combine is fully described and shown in U.S. Pat. No. 3,669,122 to E. W. Rowland-Hill, issued June 13, 1972. This invention is particularly adaptable to the type of combine disclosed in U.S. Pat. No. 4,078,571 to Todd et al, issued Mar. 14, 1978, wherein a shortened threshing and separating rotor is used in a generally cylindrical crop handling unit employing 360° or continuous separation. The continuous separating feature makes possible the use of a shortened rotor without affecting overall machine capacity. Although the present invention will be described in the context of a harvesting and threshing machine employing two side-by-side rotors, it should be noted that the principles disclosed hereafter are equally applicable to a combine employing any number of axially extending centrifugal threshing and separating means.

U.S. Pat. No. 3,669,122 is specifically directed to an axial flow type combine utilizing a rear discharge beater assembly that redirects the flow of crop material as it exits the threshing and separating cylinders prior to the material's discharge from the combine. This redirection of the crop material by the rotary beater discharge provides an auxiliary separation function to separate any grain which may still be entwined within the crop material. The grain is separated by being passed through a generally concave grate beneath the rotary discharge beater so that it falls onto a grain collection pan. The rotary discharge beater concurrently propels the waste or chaffy crop material rearwardly thereby discharging it from the combine. This direct expulsion of the waste crop material into the rear of the machine permits it to be processed in diverse ways, such as chopping, spreading or laying the crop material in a windrow behind the combine on the field. However, it has been discovered during the operation of axial flow type combines employing this type of rotary discharge beater and grate assembly that air flow generated by the beater assembly interferes with the air flow generated by the blower or fan of the cleaning means. This creates undesirable and disruptive air currents above the cleaning sieves. Such disruptive air currents disturb the pneumatic grain separation across the cleaning sieves and frequently results in the grain being blown or mechanically discharged by the counter-reciprocating motion of the cleaning assembly out the rear of the combine. Such grain loss also can be created by the rotation of the longitudinally extending threshing and separating rotors. These rotors produce an air current that passes through the separation grates and compound the problem of grain loss. This disruptive effect of the air passing through the various grates is particularly evident at the slow fan speeds of the cleaning system which must be maintained when operating in light kernel crops.

U.S. Pat. No. 3,916,912 to Rowland-Hill, issued Nov. 4, 1975, addresses this problem by replacing the separation grate beneath the rotary discharge beater with an impervious plate member which prevents the air flow from passing into the cleaning sieve area and thereby increasing the grain loss by blowing the grain from the sieves out the discharge opening at the rear of the machine. However, this solution forfeits the benefit of having the potential for auxiliary separation obtained by employing a rotary discharge beater. To fully exploit this feature an open type grate must be provided radially for a distance about the beater.

Other approaches have been taken to prevent the interference of this secondary air flow from the rotors and beater discharge assembly with the operation of the combine harvester cleaning sieve area. One such approach is shown in U.S. Pat. No. 3,847,160 to Decoene et al, issued Nov. 12, 1974. This patent discloses a combined collection grain pan and protective screen that is suspended beneath the rotors, as well as the discharge beater assembly and its auxiliary separation grate, but above the primary grain pan to prevent this secondary air flow from interfering with the grain cleaning operation. This structural arrangement deflected the secondary air flow from the rotors and the beater discharge assembly forwardly so that a precleaning of the grain was effected. The chaff or waste material carried forward in the deflected air flow was discharged out a forward chaff outlet. The obvious drawback to this type of a system is that it requires additional space within the combine and entails the additional cost of installing the collector pan and protective screen beneath the rotary components. This additional structure also adds greater weight to the components and to the reciprocating mechanisms in the cleaning area. This additional weight tends to increase the stress on the reciprocating parts and, therefore, increases the chance for failure. Lastly, this structure increases the chance of plugging or clogging of the grain pan under moist conditions since the dust that naturally builds up in such an area has the tendency to turn to mud under such conditions and can clog the grain pan and impede the natural flow of material. Since the structure shown in the Decoene patent requires the grain to travel a greater distance along the grain pans by moving first forwardly on the collector pan and protective screen and then rearwardly on the main grain pan prior to reaching the cleaning and chaffing sieves, there is a greater opportunity for plugging to occur when combines are operated under conditions with high moisture.

Additionally, in combines of the type discussed above, there is the possibility that crop material, such as corn cobs, could be passed through the beater discharge assembly grate at high velocity and impact upon the relatively fragile sieve bills of the grain and chaffer sieves. Such impacting causes damage to the sieves which is both costly and time consuming to repair. Since time is of the essence during the harvesting season, such damage can be especially significant if harvesting must be interrupted to repair it. If time is so critical that the harvesting cannot be interrupted to repair the sieves, the combine harvester will operate at reduced efficiency and higher grain losses.

SUMMARY OF THE INVENTION

The principal object of the invention is to provide an axial flow type combine having an improved compact rotor separator and beater discharge separator concept that is located above the grain collection means and crop material transport means of the cleaning assembly to keep any undesirable air or materials blasts from the rotors or the beater discharge assembly away from the cleaning sieves.

It is a feature of the instant invention to provide a mobile harvesting machine having at least one threshing and separating rotor with a grain collection means that underlies the auxiliary separation and discharge means and overlies at least a portion of the cleaning assembly.

It is an advantage of the present invention that high velocity material, such as corn cobs, passing through the beater discharge assembly grate are prevented from striking the more fragile sieve bills of the chaffer and grain sieves by the interposition of the sturdier grain collection means.

It is another advantage of this invention that there is provided a grain collection means cooperative with the cleaning assembly so that the grain and crop material that is pneumatically supported by the air flow from the cleaning fan above the cleaning sieves is not subjected to disruptive air currents from the threshing and separating means nor the beater discharge assembly during operation.

These and other objects and advantages are obtained by providing a harvesting and threshing machine utilizing at least one cooperative cylinder and rotatable rotor to achieve axial flow threshing and separation of grain bearing crop material and improved grain collection means underlying the auxiliary separation and discharge means and overlying at least a portion of the cleaning and separating means movably mounted to the frame of the machine in such a manner that air flow generated by the cleaning fan is not disturbed by the rotation of the rotor or the beater means of the auxiliary separation and discharge means.

BRIEF DESCRIPTION OF THE DRAWINGS

The advantages of this invention will become apparent upon consideration of the following detailed disclosure of the invention, especially when it is taken in conjunction with the accompanying drawings wherein.

DETAILED DESCRIPTION OF THE PREFERRED EMBODIMENT

In the following description the invention is set forth in association with a self-propelled combine harvester. However, it should be noted that the invention can also be used in other forms of threshing machines, such as a combine adapted to be pulled behind a tractor with power for the combine derived via a suitable PTO arrangement. Also, as is common in the agricultural art, right-hand and left-hand reference is determined by standing to the rear of the combine harvester and facing the direction of travel. Again, with respect to terminology, the terms crop material, grain and straw are used throughout this specification, but it is not intended that they be limited in any sense. The term crop material is used to refer to crops in general whether standing or cut and in various stages of processing. The term grain refers to that part of the crop material that may be threshed by the mechanism described herein and straw refers to all discardable crop material, such as chaff.

Figure 1:
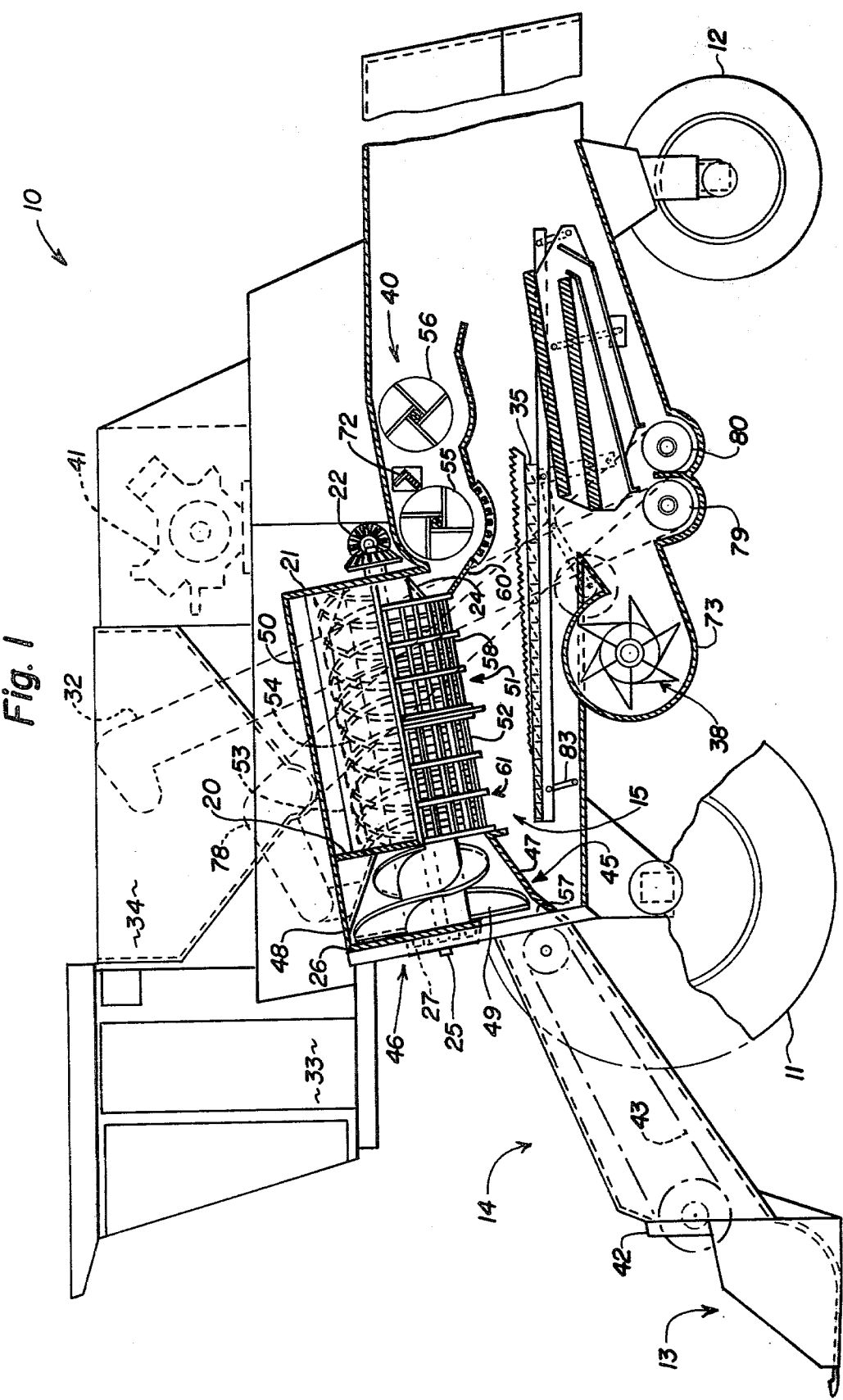
FIG. 1 is a diagrammatic partly sectional side view of a harvesting and threshing machine in which the principles of the present invention are embodied.
Figure 4:
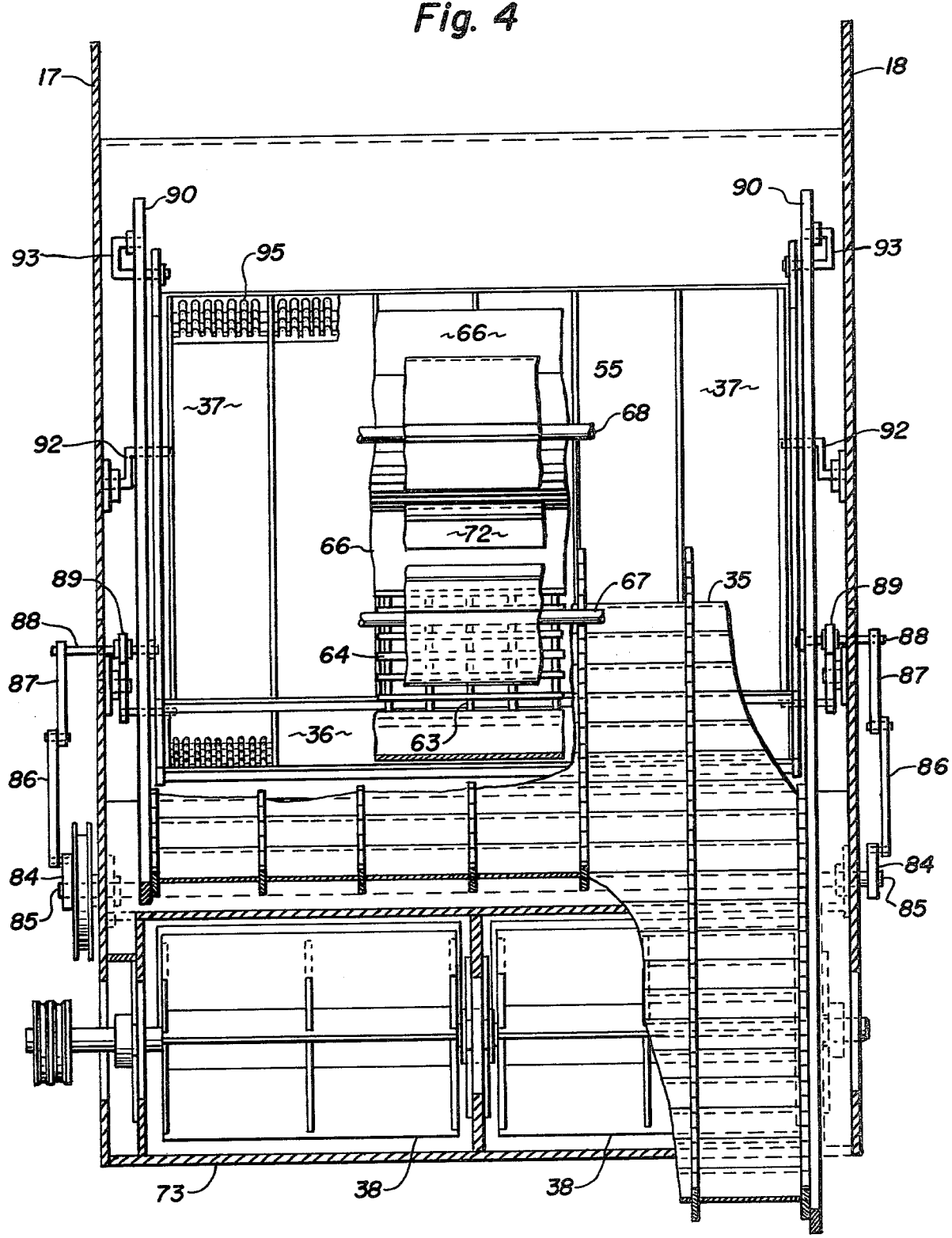
FIG. 4 is an enlarged cross-sectional view with portions broken away and omitted taken along the lines 4—4 of FIG. 2.

Referring to the drawings for a more detailed description, a combine harvester, generally designated by reference numeral 10, is shown in FIG. 1 to illustrate one arrangement in which the principles of the present invention may be employed. Combine 10 has a mobile main frame supported on a pair of front drive wheels 11 and a pair of rear steerable wheels 12. Both sets of wheels are illustrated by one wheel of a transversely spaced apart pair extending from opposite sides of the frame in a conventional manner. A crop gathering header 13 and an elevator 14 extend forwardly of the main frame. It is not uncommon to adjustably secure the header and elevator to the frame for selective vertical positioning controlled by means of standard hydraulic mechanisms (not shown). The combine 10 further includes a pair of longitudinally extending generally cylindrical crop handling units, the left one of which is designated by reference numeral 15 and is partially shown in elevation in FIGS. 1 and 2. Unit 15 and a similar right unit (not shown) carried by the frame between side walls 17 and 18, of FIG. 4, are supportably mounted at their forward and rearward ends by generally upright frame members 20 and 21, respectively (FIG. 1), and transversely extending beams (not shown) secured by suitable means to the frame in the vicinity of the side walls.

Similar right and left longitudinally extending rotors, only one of which is shown and designated by the reference numeral 24 (FIGS. 1 and 2), are disposed coaxially within each of the cylindrical units. Each rotor includes a tubular core (not shown) mounted on shaft 25, the forward end of which extends through a front wall 26 and is suitably journalled within a transverse beam 27 secured to wall 26. The rear ends of the shafts extend through upright frame member 21 and are journalled in a transverse member (not shown) supported by the frame between side walls 17 and 18. The rotors are driven via suitable gearing 22.

Completing the general combine configuration is an operator's platform 33, a grain tank 34, a grain pan 35, a grain sieve 36, a chaffer sieve 37, a cleaning fan 38 and a straw discharge assembly 40 all of which are also mounted by conventional means on the frame. The various driven components of combine 10 are powered by a standard power source 41 (shown in phantom) which customarily takes the form of an internal combustion engine.

Now turning to a more detailed description of the assemblies mentioned above, combine 10, adapted to be propelled forwardly over a field of grain bearing crop material, includes a conventional cutter (not shown) on header 13. The header is illustrated generally in FIG. 1 and could equally well be either a grain header, a pickup header for windrowed crop material, or a corn header with a plurality of individual side-by-side row units for cutting and gathering corn or other row crops. The particular type of header is usually mounted on the header frame 42 by suitable means to provide for selective height control with respect to the field surface over which the combine is propelled. Crop material is urged into the above mentioned cutter means mounted on the header. A conventional consolidating auger (not shown) laterally conveys severed crop material to the center of the header whereupon it is discharged rearwardly to the crop elevator 14. A conveyor 43 is provided within a housing 44 for conveying material rearwardly and upwardly from the header to an infeed section 45 of the combine.

Material conveyed from the elevator conveyor 43 to crop handling units, such as unit 15, via infeed section 45 is urged rearwardly by side-by-side infeed augers, the left one of which is shown and referred to by reference numeral 46 (see FIG. 1). Auger flighting 49 extends from the forward portion of the core of each rotor in infeed section 45. Infeed section 45 is defined by bottom wall 47 and top member 48 and formed so as to aid the convergence of material rearwardly toward each respective cylindrical crop handling unit. Specific features of the infeed auger portion of the rotor can best be appreciated from a study of U.S. Pat. No. 3,994,303 issued on Nov. 30, 1976, in the name of E. W. Rowland-Hill and assigned to the assignee of the present application. In the crop handling units, material is threshed and separated, that is to say, crop material such as wheat, corn, rice, soy beans, etc. is rubbed and beaten whereupon grain is first removed and then separated from the stalks, cobs or other discardable crop material.

More specifically, each crop handling unit includes a threshing section 61 and a separating section 51, both of which are shown, only generally in FIG. 1, within respective longitudinal casings having generally cylindrical configurations disposed in parallel side-by-side relation with axes lying in a fore-and-aft plane. The units are inclined slightly upwardly toward the rear. Each unit is open at its forward end to receive unthreshed crop material from an infeed auger. At the rearward end of each unit an opening is provided for straw discharge via discharge assembly 40. Thus, unit 15 comprises threshing and separating sections 61 and 51 in the forward and rearward ends thereof, respectively, which extend in tandem along the length of the unit. Both crop handling units are constructed similarly. The side walls 17,18 of FIG. 4 and a top wall 50 of the main frame extend longitudinally and in conjunction with grain pan 35 form a single generally enclosed compartment for both cylindrical units.

The threshing section 61 more specifically comprises a transversely curved longitudinally extending concave 52 along the bottom of the unit and transversely curved upper casing 53 having spirally positioned guide vanes or transport fins 54 extending inwardly therefrom. In one area of the threshing section 61 an auxiliary separation grate, not shown, but discussed in further detail in U.S. Pat. No. 4,078,571 to Todd et al issued May 14, 1978, extends above the concave. The separating section 51 extends rearwardly from the adjacent forward threshing section and comprises a grate assembly forming a cylindrical continuation over the remaining portion of the unit. The threshing section is not discussed in further detail here since it is old and generally well known in the art. Mounted in cooperative relationship with each threshing section on the forward portion of the core of each rotor is a longitudinally extending spiral rasp bar (not shown) adapted to engage crop material fed into the casing from infeed auger 46. A crop engaging blade (not shown) mounted in a spiral fashion on the rear portion of the core of rotor 24 cooperates with the separating section 51 to urge material rearwardly along a spiral path. The rasp bar and blade serve the important function of imparting centrifugal force to the material as it is being urged along its spiral path under conditions where the rotor is rotated.

In the threshing section 61 crop material is threshed and a portion of the grain is separated from the straw and discharged through concave 52 to grain pan 35. The remaining portion of the grain will be conveyed rearwardly with the straw. Separation of such entwined grain will take place within the separating section. The straw is finally discharged from the rear of the separating section into discharge assembly 40 wherein still further separation takes place via an auxiliary grate assembly 62. Eventually crop residue is propelled rearwardly by discharge beaters 55 and 56 and expelled onto the ground along the path of the combine. Meanwhile grain separated from the straw gravitates onto grain pan 35 which has longitudinally extending dividers 31 spaced transversely thereacross. The separated grain thence is vibrated rearwardly to sieves 36 and 37 in a conventional manner. The cleaned grain is ultimately elevated into grain tank 34 by means of a grain elevator 32.

Feeding and Threshing

Infeed auger 46 of infeed section 45 is of the double helical flighting type and is selectively rotated at varying speeds between approximately 280 to 1800 RPM's to feed different types of crop material in a generally axial direction to threshing section 51. In FIG. 1, the side wall of the infeed section 45 is broken away to clearly illustrate the structure in the transition between the infeed section and the threshing section 61.

The threshing section 61 of the cylindrical crop handling unit 15 includes the threshing section (not shown) of the rotor 24 plus the corresponding threshing concave 52. The cooperative interaction of the rotor 24 and the threshing concave 52 is fully described in U.S. Pat. No. 3,848,609 to Mortier et al, issued Nov. 19, 1974, hereby specifically incorporated by reference in its pertinent parts. The speed of rotation of the rotors then depend on the type and nature of crop material being handled. As can be seen in FIG. 1, flighting 49 of infeed auger 46 is wound in a direction that will feed material to the rear when rotated in a direction such that the inner portion of the flighting is traveling downwardly when it is adjacent the companion rotor. The augers are enclosed by sides (not shown), front wall member 26, top member 48 and an inclined bottom wall 47; all of which form an enclosed generally rearwardly converging infeed section 45 in which the infeed auger 46 urges material rearwardly to threshing section 61. During operation of the combine, the auger 46 is adapted to receive unthreshed crop material from conveyor 43 of elevator 14 through an inlet opening 57 through front wall 26. As the auger 46 rotates, unthreshed crop material will be fed to the drawn in by the flighting from a bottom direction over bottom wall 47.

Separation

Rearward of threshing section 61 of the crop handling unit 15 is the separating section 51. The rotor 24 has mounted about its periphery diametrically opposed pairs of crop engaging blades (not shown). The forward portions of the blades cooperate with the separation grate 58, best shown in partial form in FIG. 4, to separate grain from the crop material as discussed in greater detail in previously mentioned U.S. Pat. No. 3,848,609 to Mortier. The blades are spirally mounted so as to urge crop material along its rearward helical path in cylindrical crop handling unit 15 while imparting a centrifugal force to the material as it is separated. Thus, the crop material which is passed through the cylindrical crop handling unit passes over the various concaves and grates which loosen and remove grain from the crop material which passes therethrough in a mat. The grain thus removed passes through the concaves and grates and lands on the grain pan 35. Crop material which does not gravitate through the concaves and grates is discharged through a discharge opening at the rear portion of the separating section 51 defined by the rear edge of grate member 59, the lower portion of the separating grates 58 and the lower edge of the upper portion of the separating grate (not shown). This opening then permits the discharge of crop material into the straw or beater assembly 40. Thus, when material being carried about the rotor 24 reaches the rear portion of the separation section 51 it is propelled by the crop engaging blades out of the opening and downwardly toward the first discharge beater 55. The grain that passes through grain sieve 36 lands on chute 74 which permits the grain to gravitate down into grain auger 75 which laterally transfers the grain to the vertically rising grain elevator 32 of FIG. 1 for ultimate deposit in the grain tank 34. The larger material, such as unthreshed heads commonly referred to as tailings, are discharged to the rear of sieve 36 by its reciprocating motion and directed by guide chute 76 into the tailings auger 77, best shown in FIG. 4. Tailings auger 77 laterally transfers the tailings to elevator 78 (shown in FIG. 1) which recirculates the tailings to the infeed section 45 where the infeed auger 46 directs them into the threshing and separating sections 51 and 61 again. The grain auger 75 and the tailings auger 77 are located in troughs 79 and 80, respectively, which are formed from a portion of the lower frame member 82.

Figure 2:
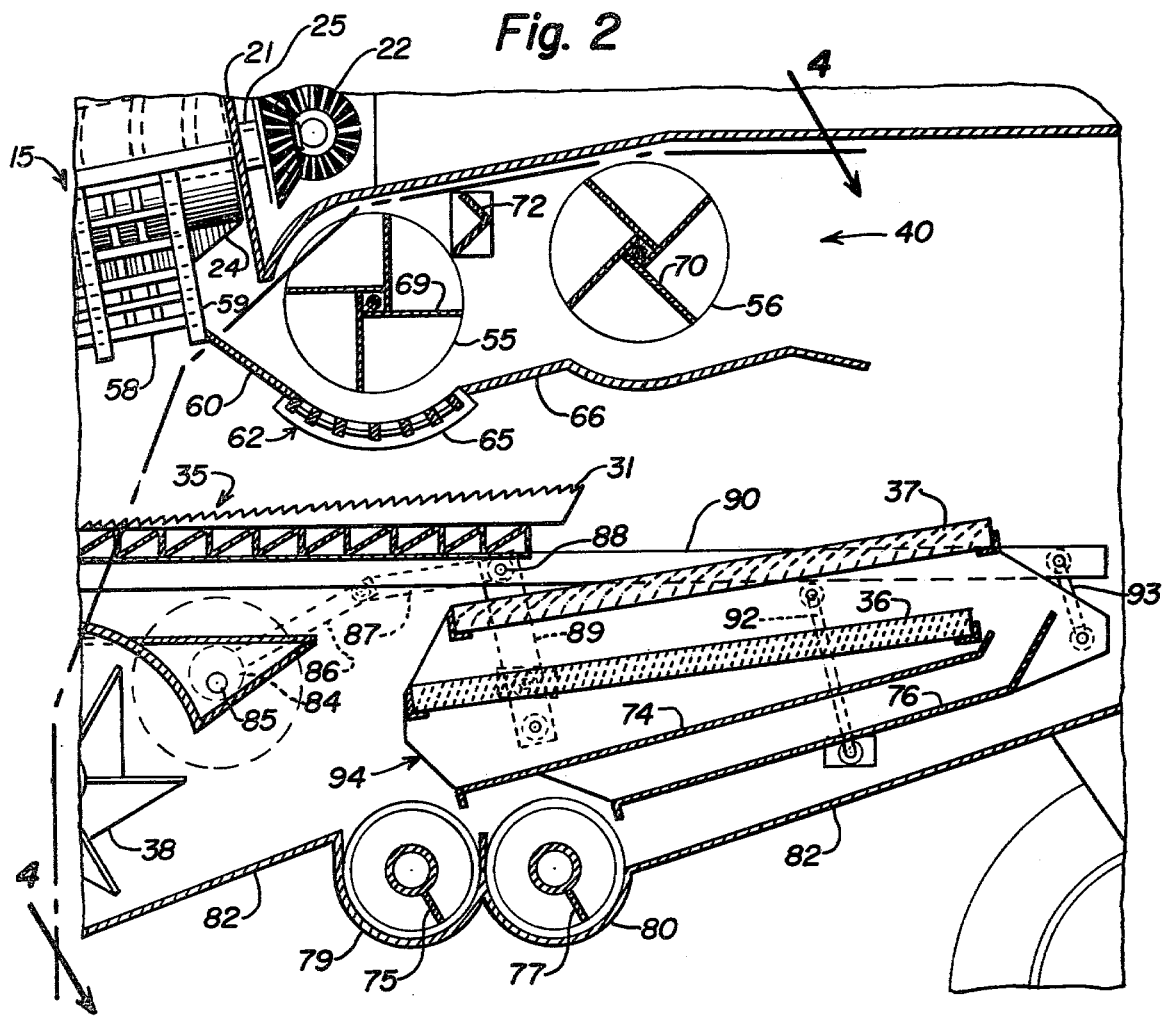
FIG. 2 is an enlarged partly sectional side view of a harvesting machine shown in FIG. 1 with the auxiliary separating and discharge means and the cleaning and separating means shown in detail.

The grain pan 35 and the sieves 36 and 37 are driven conventionally in their reciprocating or fore-and-aft directions by a series of belt and chain driven power transfer connections (not shown) from the main power output shaft (not shown) of the engine 41. The grain pan 35 is mounted to a pair of opposing cranks 83, only one of which is shown in FIG. 1. An eccentric crank 84 (FIG. 2) mounted about rotatable shaft 85 provides the driving force through links 86 and 87 to impart the reciprocating action to the grain pan 35 and sieves 36 and 37 in the manner which has standardly been practiced in the combine harvester industry. A stub shaft 88 connects link 87 and pivotal arm 89 to grain pan support member 90 (only one of which is shown in FIG. 2). Cranks 92 and 93 support the grain pan support member 90 and the sieve sub-assembly 94, respectively, at the rearward end of the combine.

Cleaning and Discharge

Figure 3:
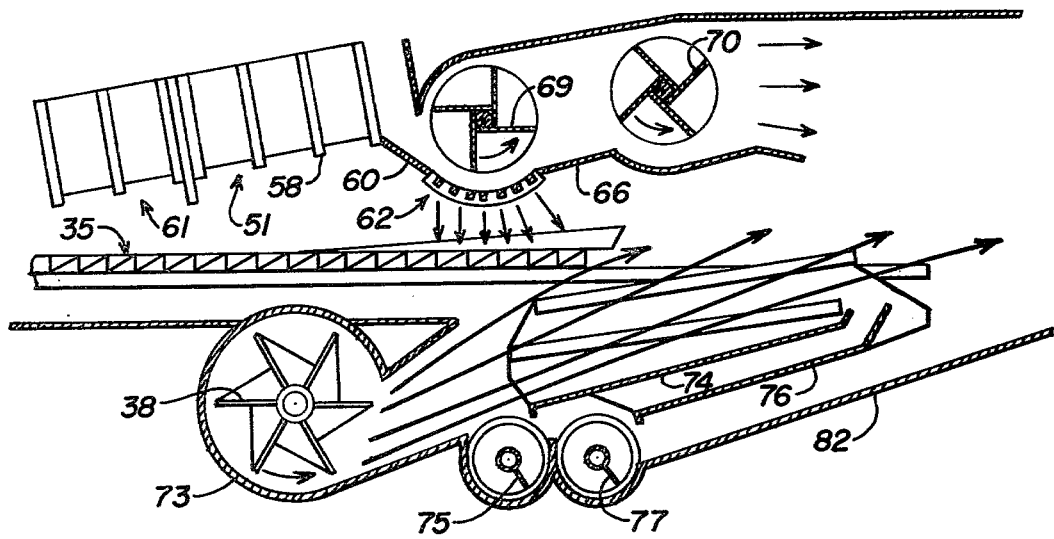
FIG. 3 is an enlarged partly sectional side view of the harvesting and threshing machine shown in FIG. 1 diagrammatically illustrating the flow of air currents generated by the rotary operated components.

A ramp member 60 extends rearwardly and downwardly from a supporting bracket (not shown) secured to the lower portion of the lower section of the separating grate. The ramp member 60, best shown in FIGS. 2 and 3, extends rearwardly to the forward edge portion of an arcuately shaped auxiliary grate assembly 62 mounted between the first discharge beater 55 and grain pan 35. An appropriate mesh is provided by arcuate shaped rod members 63 (FIG. 4) extending through transverse rub members 64 and in parallel relation to side elements 65 shown in FIG. 2. A transition member 66 is attached to the rear edge of the auxiliary grate assembly 62 to provide a continuation of the surface over which straw material is passed rearwardly to a second discharge beater 56. Discharge beaters 55,56 are of similar construction and comprise transverse shafts 67,68 of FIG. 4 journalled in side walls 17,18 (not shown) and adapted for appropriate coupling (not shown) to the power source for rotation in a counterclockwise direction. The discharge beaters 55 and 56, best shown in FIGS. 2 and 3 further comprise two sets 69 and 70 of four symmetrically arranged paddles, one set on each beater respectively, extending between circular side supports (not shown) in a generally radially outward direction. Completing the straw discharge assembly 40 is a stripper element 72 having an angled cross section and adapted to prevent material from wrapping around the first discharge beater 55, whereupon straw is stripped and passed to the second discharge beater along a generally rearward path.

Grain that gravitates through the grates of the cylindrical crop handling units and the discharge beater auxiliary grate assembly 62 comes to rest on grain pan 35. The configuration of this grain pan is of a conventional nature as illustrated in part by the cut away viewing in FIG. 4. Reciprocal motion of the grain pan, most clearly shown in FIGS. 2 and 3, causes material to be urged rearwardly and dropped off the rear edge of the grain pan onto upper chaffer sieve 37. The chaffer sieve 37 is shown in FIG. 4 is a cut away viewing with its sieve bills represented by the numeral 95. The chaffer sieve 37 is provided with means whereby the apertures in the sieve 37 can be adjusted so that grain received on the sieve may fall through the sieve while the trash or waste crop material is shaken rearwardly by appropriate reciprocal motion for discharge. In a like conventional manner, the lighter chaff also is blown rearwardly by means of the air flow generated by cleaning fan 38, which is composed of two separate units, best seen in FIG. 4, and operatively mounted in an appropriate fan housing 73. The lower sieve or gain sieve 36 is provided with adjustable apertures or sieve bills so that only clean grain can ultimately pass through to grain chute 74 and grain auger 75. The chaffer sieve 37 and grain sieve 36 operate in opposed reciprocating action to help keep the sieves open and clean while allowing the grain to fall through. The air flow generated by the fan 38 pneumatically supports the grain and crop material as it is mechanically urged rearwardly by the reciprocating action of the sieves until the separation of the grain, tailings and residue crop material is completed as described in greater detail hereinafter. Both of the sieves are of a conventional nature and further description is felt to be unnecessary.

Operation and Advantages

In operation, crop material is fed from header 13 via elevator 14 and infeed section 45 of cylindrical crop handling unit 15 and its adjacent corresponding unit. Crop material is fed to threshing and separating sections 61 and 51 of each cylindrical unit in a parallel side-by-side manner via a pair of infeed augers 46 in the infeed section 45 of the combine. In each threshing section, situated at the forward end of the cylindrical unit, crop material is fed in a generally longitudinal or axial direction into the rotors 24 in an undershot fashion. Material is then urged along a helical path by the spiral rasp bars which bring about threshing of the crop against concaves 52 thereby loosening again kernels and discharging a substantial portion of such kernels through openings in the concave. During travel of material along its helical path adjacent the upper casing 53, it engages vanes 54 disposed to aid in the guidance thereof. As material continues along its rearward generally helical path it makes multiple passes past the concaves for further threshing of the grain until finally in its last pass adjacent the concaves it travels immediately past the auxiliary separating section of the separator grate. Thus, the material which is in the form of a mat passes repeatedly across the concaves for successive threshing and thereby minimizes grain loss.

In the separating section of each cylindrical unit, the mat continues along its helical path and is guided by the rotor blades in conjunction with the lateral support members of the separating grate, which members are disposed in a plane slightly askew to the rotor axis. Immediately following the last pass of the mat of crop material over the concave it engages the separating grates 58. This thereby enhances the overall effectiveness of the threshing and separating feature of the combine. In the next portion of the separating section there is a completely cylindrical separating grate to which material is exposed as it is urged rearwardly along its helical path by the crop engaging blades of the rotor 24 in cooperation with the askew transverse members of the upper grate section. In this area of the separating section grain is continuously separated from the straw by gravity and centrifugal force resulting in grain discharge through the apertures in the grate over the full circumference of the unit. The straw which is in the form of a mat continues to be moved rearwardly within each cylindrical crop handling unit whereupon the straw of remaining residue of crop material, subsequent to its last pass through the separating section, reaches the discharge area and is spilled downwardly into the straw discharge assembly. The straw mat is then reoriented, i.e., changed from a spiral path to a longitudinal path via beaters 55 and 56. In this reoriented position, the straw mat then engages auxiliary grate assembly 62 and an additional portion of the grain in the straw is dislodged and discharged through the apertures in the grate to grain pan 35.

The use of a crop handling unit with separation grates about its entire circumference to achieve continuous 360° separation permits a shorter length rotor and an auxiliary beater discharge and separation assembly position in much closer relationship to be employed. This achieves a compact centrifugal separation and auxiliary beater discharge and separation system that is much shorter in end to end length than previous axial flow type systems and, therefore, reduces the amount of secondary air flow interference in the cleaning sieve area than normally occurs. The resultant positioning of the grain pan 35 beneath both the crop handling unit 15 and the discharge beater 55 with its auxiliary separation grate assembly 62, as well as the grain pan's overlying at least a portion of the cleaning apparatus including the cleaning fan 38 and the chaffer sieve 37 and grain sieve 36, prevents any undesirable air or material blasts from the rotor 24 or discharge beaters 55 and 56 from interfering with the air flow generated by the cleaning fan 38. The grain pan 35 in essence serves as a buffer to prevent the air currents generated by the rotational movement of the rotors 24 or either of the beaters 55 and 56 from passing into the primary cleaning area. It is this positional relationship that permits the compact rotor separation and discharge separation beater concept to function in the environment of an axial flow type combine utilizing 360° separation.

Meanwhile the grain that has been previously discharged through the separating and threshing sections of the cylindrical crop handling unit has gravitated to the grain pan and is also being conveyed rearwardly by means of a shaking motion. Ultimately the grain is discharged from the grain pan 35 and falls onto and through the sieves 36 and 37 and is eventually deposited in appropriate crop grain handling means for transport to the grain tank 34.

More specifically, in the separating section grain is discharged via the separation grate over a full 360° of the circumference of the crop handling unit. The upper and lower portions of the separating section are continuous from the rearward end of the concave to the forward end of the discharge opening adjacent the straw discharge assembly. During separation the downward movement of the rotors at their position of adjacency at the center produce a discharge of grain in a generally uniform precipitation pattern which may increase slightly in density at the position directly below the center of each rotor and then again increase slightly toward the outer walls of the enclosure means. These slight variations differ from crop to crop. Thus, grain is discharged through the apertures in the grate during rotation of the rotor which imparts a centrifugal force to the crop material to effect separation over the full circumference of the separating section. Grain is discharged outwardly through the grate toward the sides and top walls as well as toward the grain pan underneath. The direction of discharge is determined by the radial position at which the grain is dislodged from the mat of crop material as it is being conveyed rearwardly through the separating section by virtue of the rotative action of the blades disposed in a spiral path. This 360° separation design permits a shorter length rotor to be utilized to obtain greater machine capacity with lower horsepower requirements.

Therefore, the unique arrangements contemplated by the present invention present a combine in which a better throughput of material is provided and, therefore, an overall enhancement of the harvesting speed is realized. Besides the many known advantages of axial flow threshing and separation and the dual rotor concept, the present machine provides the additional feature of the compact rotor separation and discharge separation beater concept in the environment of a combine harvester utilizing continuous separation of crop material in the separating section of each crop handling unit. This feature and the positional relationship also prevents crop material discharged from the discharge beaters 55 or 56 from being directed at high velocity onto the fragile bills 95 of the chaffer sieve 37, since the more rugged construction of the grain pan 35 is positioned so as to intercept any such projected materials.

While the preferred structure in which the principles of the present invention have been incorporated is shown and described above, it is to be understood that the invention is not to be limited to the particular details as presented but, in fact, widely different means may be employed in the practice of the broader aspects of this invention. The scope of the appended claims is intended to encompass all obvious changes in the details, materials and arragements of parts which will occur to one of skill in the art upon a reading of this disclosure.

Having thus described the invention, what is claimed is:

1. A harvesting and threshing machine comprising:
   (a) a mobile frame adapted to be driven across a field of grain bearing crop material;
   (b) a harvesting attachment mounted to the frame extending forwardly therefrom for removing crop material from the field and delivering it generally rearwardly;
   (c) infeed means mounted on the frame receiving crop material from the harvesting attachment and conveying it generally rearwardly;
   (d) at least one axial flow threshing and separating cylinder fastened to the frame and extending in a generally fore-and-aft direction along the frame for receiving crop material from the infeed means, the cylinder further having a threshing portion with a transversely arcuate concave and a separating portion rearward of the concave;
   (e) transport means affixed to the threshing and separating cylinder for guiding the crop material rearwardly in a generally helical path within the cylinder;
   (f) a fore-and-aft extending rotor means rotatably mounted in the threshing and separating cylinder, the rotor including threshing means adjacent the concave and crop engaging means adjacent the separating portion for urging crop material rearwardly concurrently with the separation of the grain therefrom when the rotor means is rotated;
   (g) a primary cleaning and separating means including a fan generating an air flow to aid in separating lighter crop material from heavier grain, upper sieve means and lower sieve means, both extending in a generally fore-and-aft direction and movably fastened to the frame below and generally rearwardly of the rotor means;
   (h) auxiliary separation and discharge means mounted transversely across the frame rearwardly of the rotor and above the primary cleaning and separating means, the auxiliary separation and discharge means further including a rotatable beater means and a separation grate adjacent and underlying the beater means; and
   (i) grain collection means movably fastened to the frame underlying the auxiliary separation and discharge means and overlying at least a portion of the primary cleaning and separating means, the collection means further extending rearwardly so that the air flow generated by the cleaning fan is not disturbed by the rotation of the rotor means and the beater means during the operation of the machine.

2. The harvesting and threshing machine according to claim 1, wherein the lower sieve means at least partially underlies the upper sieve means and the upper and lower sieve means move in counter-reciprocating paths during the operation of the machine.

3. The harvesting and threshing machine according to claim 2, wherein the threshing and separating cylinder further comprises a threshing section and a separating section, the threshing section having an arcuate shaped concave with a grate-like configuration and the separation section comprising a cylindrically shaped grate.

4. In a harvesting and threshing machine having a mobile frame, at least one axial flow threshing and separating cylinder and a corresponding fore-and-aft extending rotor rotatably mounted in the cylinder, a grain cleaning system having a primary cleaning separating apparatus with a cleaning fan and an auxiliary rotary separation and discharge apparatus, the auxiliary rotary separation and discharge apparatus being rotatably mounted to the frame transversely and rearwardly of the rotor, and an improved grain collection means mounted to the frame in a generally fore-and-aft direction and beneath the rotor, the grain collection means further underlying the auxiliary rotor separation and discharge apparatus extending rearwardly thereof and overlying the primary cleaning and separating apparatus such that air flow generated by the cleaning fan is not disturbed by the rotation of the rotor nor the auxiliary rotary separation and discharge apparatus during the threshing and cleaning operation of the machine.

5. The harvesting and threshing machine according to claim 4, wherein the threshing and separating cylinder, further comprises a threshing section and a separating section, the threshing section having an arcuate shaped concave with a grate-like configuration and the separating section comprising a cylindrically shaped grate.

6. The harvesting and threshing machine according to claim 5, wherein the primary cleaning and separating apparatus further comprises an upper sieve means and a lower sieve means extending in a generally fore-and-aft direction fastened to the frame below and generally rearwardly of the rotor, the lower sieve means at least partially underlying the upper sieve means.

7. The harvesting and threshing machine according to claim 6 wherein the upper and lower sieve means move in counter-reciprocating paths during the operation of the machine.

8. The harvesting and threshing machine according to claim 7, wherein the auxiliary rotary separation and discharge apparatus further comprises an auxiliary discharge beater rotatably mounted to the frame rearwardly of the auxiliary rotary separation and discharge apparatus.

* * * * *